W. GLEASON.
Machine for Cutting the Teeth of Wooden Gears.
No. 9,469. Reissued Nov. 16, 1880.
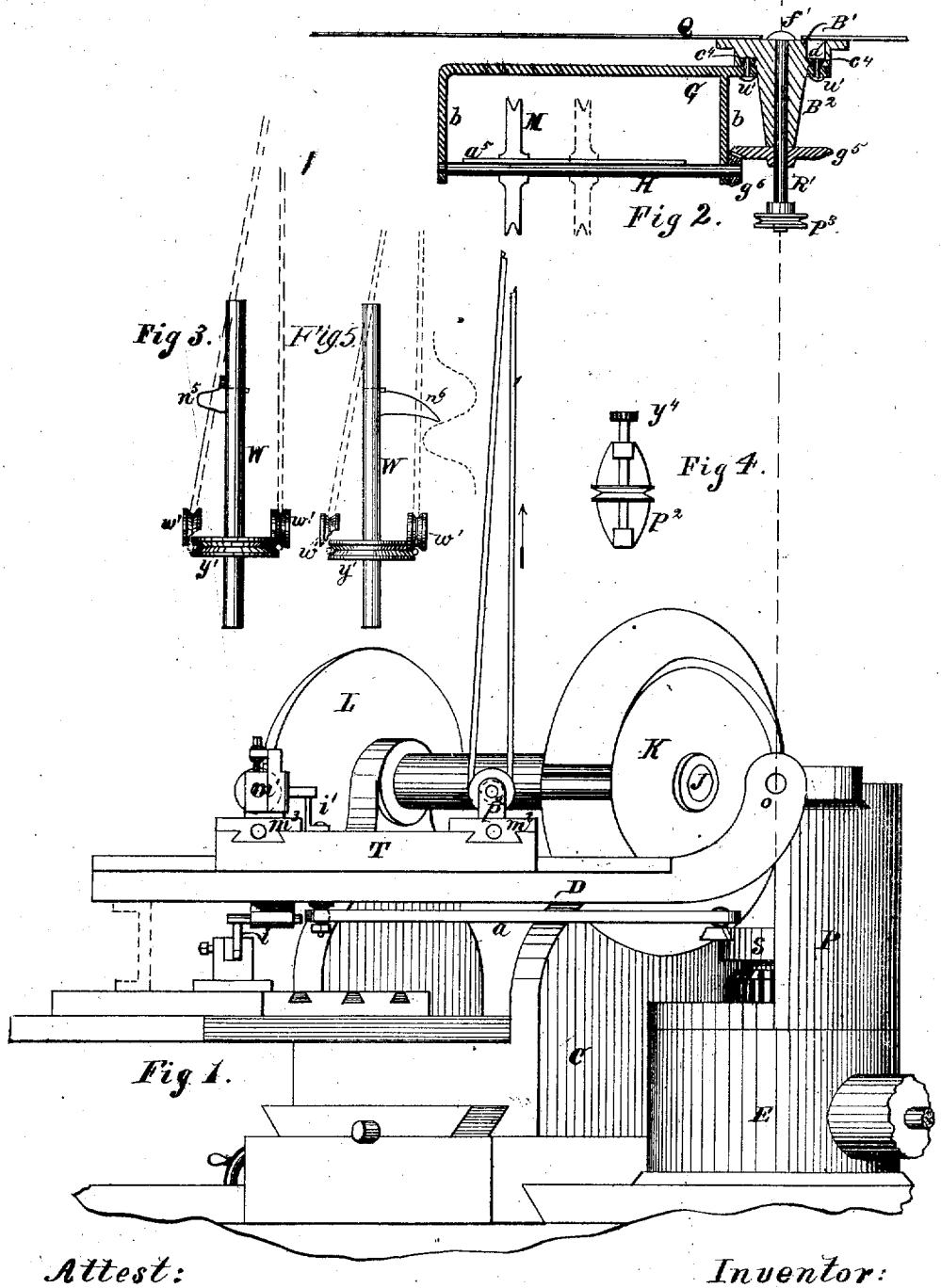
Attest:
Wm. A. Montgomery
James E. Booth
Inventor:
Wm Gleason
per Frank H. Clement
Atty.

UNITED STATES PATENT OFFICE.

WILLIAM GLEASON, OF ROCHESTER, NEW YORK.

MACHINE FOR CUTTING THE TEETH OF WOODEN GEARS.

SPECIFICATION forming part of Reissued Letters Patent No. 9,469, dated November 16, 1880.

Original No. 175,859, dated April 11, 1876. Application for reissue filed March 22, 1880.

DIVISION B.

*To all whom it may concern:*

Be it known that I, WILLIAM GLEASON, of Rochester, in the county of Monroe and State of New York, have invented certain Improvements in Machines for Dressing Wooden Gear-Teeth, of which the following is a clear and accurate description, reference being had to the accompanying drawings, in which—

Figure 1 is a side elevation of a gear-dressing machine, showing, in connection with the sectional view, Fig. 2, the general arrangement and construction of the parts involved in my invention. Figs. 3 and 5 show cutters applied to an upright shaft and a method of driving them. Fig. 4 is a plan view of a horizontal shaft and cutter.

The nature of my invention consists in providing a gear-dressing machine with attachments by which wooden gear-teeth and the teeth of wooden gear-patterns may be accurately dressed, such attachments being applicable to my improved gear-dressing machine described in Division A of this reissue.

Referring briefly to the principal parts of my gear-dressing machine, as shown in Fig. 1, C is a head-stock, on the axis J of which the gear, K, to be dressed is secured.

L is the dial-plate. E is a cylindrical support, carrying at its upper extremity the turret P, to which is attached the hinged slide D, and T is a tool-saddle, which is reciprocated by the pitman *a* and crank *s*.

The slide D, head-stock C, and turret P are arranged to be adjusted so that a cutting-tool properly arranged on saddle T will follow the lines of either a bevel or spur gear of any diameter or face within the capacity of the machine, the shape of the tooth being determined by a pattern or templet, *i*, as fully described in Division A of this reissue with reference to iron gears.

To dress the faces of wooden teeth keyed into mortise-wheels, I design to use a small sharp cutter-head, $y^4$, Fig. 4, fixed on the end of a rapidly-revolving spindle mounted upon a sort of a head-stock, $p^2$, as represented in Figs. 1 and 4. This cutter is designed to be operated in cutting the wooden teeth of spur or bevel gears in nearly the same manner as the cutting-tools described in Division A are operated in planing the iron teeth of similar wheels. When arranged to dress the wooden teeth of bevel-gears the head-stock carrying the cutter-spindle is substituted for the iron-cutting-tool stock, and is rigidly fastened to a sliding block similar to $m^2$. The cutter-head is then brought to the proper relative position with reference to the center of the cylindrical support E and axis *b*, as described in Division A with reference to the point of the iron-cutting tool. The saddle T being reciprocated, the revolving cutter is advanced in successive cuts by the feed from the point to the root of the tooth, copying the contour of the form *i* upon the face of the same.

To dress the faces of wooden spur-teeth, the head-stock $p^2$, carrying the cutter-spindle, is fastened to the tool-stock $m'$, adjusted and fed as before, copying the form of $i'$ upon the faces of the teeth in the manner described in Division A for dressing the teeth of metal spur-gears. The reverse faces of the wooden bevel and spur teeth are cut by the same cutter-head, forms of reverse curvature being used.

I prefer to run this cutter-spindle by a round belt or cord running on the grooved pulley (shown keyed to said spindle) at a quarter-twist from the large grooved pulley M (shown in section in Fig. 2) on the counter-shaft H. In said figure, B′ is a circular plate, bolted overhead to the joist or ceiling Q, having a conical portion, $B^2$, extending downward, through the center of which the vertical shaft R′ passes and has its bearing, the head $f'$ of the shaft preventing it from dropping out.

$g^5$ is a bevel-gear keyed to the shaft R′, shouldering against the lower end of the cone $B^2$, which drives the pinion $g^6$. This latter is keyed to the end of the horizontal counter-shaft H, which is journaled in the ends of the two arms *b* of the hanger G.

$p^3$ is a grooved pulley fastened to the lower end of the shaft R′, designed to be driven by a round belt running at a quarter-twist from another grooved pulley keyed to the line-shaft.

The plate B′ has a circular dovetailed groove cut in its under surface, in which two nuts, $c^4$, are fitted to slide, being dropped into place through the square opening *d*, cut from the upper surface of the plate B′ down through to the said groove.

The hanger G, having a hole cut through it, is slipped upon the cone $B^2$, and fastened to the under surface of the plate B′ by the screws $w'$ passing through the same and entering the nuts $c^4$.

The plate B′ is intended to be fastened to the ceiling in such a position that the shaft R′ shall stand vertically over the central shaft in the support E.

By loosening the clamping-screws $w'$ the hanger G, with the radial counter-shaft H, may be swung around horizontally, and made to occupy a position in the same vertical plane as that of the slide D, the nuts $c^4$ sliding in the circular groove, as above described. At a convenient place the hanger G is graduated in degrees of the circle, corresponding to the graduation on the turret P, by means of which the counter-shaft H and slide D may conveniently be made to occupy a position in the same vertical plane.

$a^5$ is a spline inserted longitudinally in the side of the shaft H, and the pulley M has a corresponding keyway cut in its hub, and is made to slide to any desired position along the shaft, so as to correspond to the position of the cutter-spindle $p^2$, Fig. 1.

W in Fig. 3 is an upright cutter-spindle, that I prefer to use in dressing the wooden teeth of spur and bevel gears, which is designed to be driven in a manner similar to that of the spindle $p^2$, Fig. 1, as above described. The driving-belt leads from the pulley M, Fig. 2, to the pulley $y'$, approaching and leaving the same horizontally by passing under the idlers $w'$. $n^5$ is a steel cutter, inserted in a mortise cut at a suitable place through the spindle W, the contour of the cutting portion of the same being made to conform to that of a cross-section of the desired space between the teeth of a spur-wheel.

To use this attachment for dressing the teeth of spur-wheels, it is fastened in some suitable manner to the saddle T. The slide D is bolted to the post N in the manner described in Division A, and the connecting-rod $a$ and feed-rod are detached. The revolving cutter $n^5$ is brought into a position so that when once passed through between two teeth it finishes the opposing faces of the same and the bottom of the space, thus giving to all the teeth of the gear, when finished, the desired shape without copying a form, as in the other cases.

To dress the teeth of bevel-gears, a tool (represented at $n^6$) is substituted for the one shown at $n^5$, which copies the form $i$ and finishes the face of a tooth in successive cuts, similarly to the action of the cutter $p^2$, as before described. This cutter $n^6$, it will be seen, acts upon but one face of a tooth at a time. In using the cutter $n^5$ for cutting through the spaces between the teeth, the saddle T is intended to be pushed along the slide D by hand, instead of being reciprocated by the crank $s$, as in the other cases, though it may be so reciprocated by giving to the said crank a comparatively slow motion.

What I claim as my invention, and desire to secure by Letters Patent, is—

1. In a gear-dressing machine, the combination, with a pivoted turret, hinged slide, reciprocating tool-saddle, and a revolving wood-cutting spindle, of a grooved pulley traveling on a counter-shaft journaled in the arms or brackets of a swiveled hanger, substantially as and for the purpose shown and described.

2. In a gear-dressing machine, the combination of the pivoted turret P, hinged slide D, reciprocating tool-saddle T, and a suitably-arranged wood-cutting spindle with the splined counter-shaft H, grooved pulley M, pinion $g^5$, swiveled hanger G, having arms $b$ $b$, shaft R′, carrying gear $g^5$, cone $B^2$, and pulley $p^3$, all constructed and arranged substantially as and for the purpose specified.

WILLIAM GLEASON.

Witnesses:
HAMLET S. BRIGGS,
F. H. CLEMENT.